United States Patent
Kim

(10) Patent No.: US 8,269,933 B2
(45) Date of Patent: Sep. 18, 2012

(54) LIQUID CRYSTAL DISPLAY AND FABRICATING METHOD THEREOF

(75) Inventor: Dong Guk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/242,871

(22) Filed: Sep. 23, 2011

(65) Prior Publication Data

US 2012/0008078 A1    Jan. 12, 2012

Related U.S. Application Data

(62) Division of application No. 11/400,292, filed on Apr. 10, 2006, now Pat. No. 8,045,127.

(30) Foreign Application Priority Data

Apr. 15, 2005    (KR) ............................ P2005-0031360

(51) Int. Cl.
*G02F 1/1337* (2006.01)
*G02F 1/1333* (2006.01)
*G02F 1/13* (2006.01)

(52) U.S. Cl. ......... 349/123; 379/126; 379/158; 379/187

(58) Field of Classification Search .................. 349/123, 349/126, 158, 187
See application file for complete search history.

(56) References Cited

U.S. PATENT DOCUMENTS

| | | | |
|---|---|---|---|
| 6,713,135 B2* | 3/2004 | Gibbons et al. | 428/1.26 |
| 2003/0117573 A1* | 6/2003 | Yi et al. | 349/158 |
| 2003/0147040 A1* | 8/2003 | Park et al. | 349/187 |
| 2003/0173033 A1* | 9/2003 | Lee et al. | 156/382 |
| 2004/0189913 A1 | 9/2004 | Kim et al. | |
| 2004/0263769 A1 | 12/2004 | Lee et al. | |
| 2005/0117093 A1 | 6/2005 | Kim et al. | |
| 2006/0141373 A1* | 6/2006 | Casper Bijnen et al. | 430/22 |

FOREIGN PATENT DOCUMENTS

| | | |
|---|---|---|
| JP | 11-024079 | 1/1999 |
| JP | 2000-066179 | 3/2000 |
| KR | 1995-025463 | 9/1995 |

* cited by examiner

*Primary Examiner* — Mark Robinson
*Assistant Examiner* — Charles Chang
(74) *Attorney, Agent, or Firm* — McKenna Long & Aldridge LLP

(57) ABSTRACT

A liquid crystal display (LCD) device includes first and second substrates with a liquid crystal material therebetween; a first alignment film formed on the first substrate and a second alignment film formed on the second substrate; a first align mark on the first substrate, the first align mark formed of the same material as the first alignment film and formed in a shape of any one of a circle, square and cross; and a second align mark to be aligned with the first align mark on the second substrate.

2 Claims, 10 Drawing Sheets

FIG. 4

| PATTERN | | Mean | | StDev | | Min | | Z Bench | |
|---|---|---|---|---|---|---|---|---|---|
| | | 1ST | 2ND | 1ST | 2ND | 1ST | 2ND | 1ST | 2ND |
| SMALL PATTERN SIZE 600μm~1200μm | a | 71.05 | 73.84 | 4.09 | 5.25 | 64 | 64 | 2.70 | 2.64 |
| | b | 72.53 | 75.00 | 3.93 | 4.42 | 63 | 68 | 3.19 | 3.39 |
| | c | 70.05 | 71.89 | 2.61 | 3.53 | 65 | 65 | 3.86 | 3.37 |
| | d | 66.53 | 63.48 | 6.07 | 2.42 | 51 | 58 | 1.08 | 1.53 |
| | e | 64.58 | 63.21 | 7.91 | 2.70 | 47 | 57 | 0.58 | 1.19 |
| | f | 62.74 | 69.42 | 5.81 | 8.43 | 54 | 53 | 0.47 | 1.12 |
| LARGE PATTERN SIZE 1200μm~3000μm | a | 73.74 | 71.95 | 3.29 | 4.20 | 70 | 67 | 4.73 | 2.84 |
| | b | 65.42 | 66.95 | 8.52 | 4.27 | 50 | 61 | 0.64 | 1.63 |
| | c | 59.79 | 58.00 | 8.47 | 4.22 | 40 | 53 | -0.02 | -0.47 |
| | d | 69.32 | 63.63 | 5.47 | 4.22 | 57 | 58 | 1.70 | 0.86 |
| | e | 65.00 | 65.16 | 7.09 | 2.06 | 50 | 63 | 0.71 | 2.50 |
| | f | 71.95 | 61.42 | 6.94 | 2.32 | 61 | 56 | 2.00 | 0.61 |

LIQUID CRYSTAL DISPLAY AND FABRICATING METHOD THEREOF

This application is a Divisional of application Ser. No. 11/400,292 filed Apr. 10, 2006, now U.S. Pat. No. 8,045,127 now allowed, which claims priority to Korean Patent Application No. 10-2005-0031360, filed Apr. 15, 2005, all of which are incorporated by reference in their entirety for all purposes as if fully set forth herein.

BACKGROUND OF THE INVENTION

1. Field of the Invention

The present invention relates to a liquid crystal display, and more particularly to a liquid crystal display and fabricating method thereof that can improve productivity and yield.

2. Discussion of the Related Art

A liquid crystal display controls the light transmittance of liquid crystal by use of electric field, thereby displaying a picture. To this end, the liquid crystal display includes a liquid crystal display panel in which a plurality of liquid crystal pixel cells are arranged in a matrix at each crossing of data lines and gate lines, and a drive circuit for driving the liquid crystal display panel.

Generally, the liquid crystal display panel includes a thin film transistor substrate and a color filter substrate which face each other; liquid crystal injected between the two substrates; and a spacer for keeping a cell gap between the two substrates.

The thin film transistor substrate includes a pixel electrode which is formed at each of liquid crystal pixel cell areas defined by the crossing of the gate line and the data line; a thin film transistor connected to the gate line, the data line and the pixel electrode; a plurality of insulating films; and an alignment film formed for aligning the liquid crystal in an initial direction.

The color filter substrate includes a color filter formed at each liquid crystal pixel cell; a black matrix for dividing between color filters and blocking external light; a common electrode for supplying a reference voltage to the liquid crystal; and an alignment film for aligning the liquid crystal thereon.

The thin film transistor substrate and the color filter substrate are bonded together, and then the liquid crystal is injected and sealed to complete the liquid crystal display panel. Alternatively, the liquid crystal is spread over any one of the two substrates, and then the two substrates are bonded together to complete the liquid crystal display panel. At this moment, the color filter substrate and the thin film transistor substrate are bonded together by aligning the color filter of the color filter substrate and the pixel electrode of the thin film transistor substrate in a one-to-one relationship.

To this end, an align mark is formed for bonding together the thin film transistor substrate and the color filter substrate. The align mark of the thin film transistor substrate is formed together with a gate electrode in a process of forming the gate electrode on a lower substrate. And, the align mark of the color filter substrate is formed together with the black matrix in a process of forming the black matrix on an upper substrate.

When bonding together the thin film transistor substrate and the color filter substrate, if there is misalignment between the thin film transistor substrate and the color filter substrate, a light leakage defect can be generated in the liquid crystal display. In order to prevent such a problem, there is a method in which the width of the black matrix of the color filter substrate is wider, but this method degrades the aperture ratio of the liquid crystal display.

Accordingly, there has recently been proposed a color filter on thin film transistor (hereinafter, referred to as "COT"), where the color filter is formed on the thin film transistor substrate.

FIG. 1 is a cross sectional view illustrating a liquid crystal display of a COT structure according to the related art.

Referring to FIG. 1, the liquid crystal display of the COT structure according to the related art includes a thin film transistor substrate (hereinafter, referred to as a "lower plate") and a upper plate. The lower plate has a thin film transistor on a lower substrate 1; a color filter 34 for realizing R, G, B pixels formed on the thin film transistor and a black matrix 32; a pixel electrode 22 overlapped with the color filter 34 with an overcoat layer 52 therebetween; and a lower alignment film 38 for aligning liquid crystal. The upper plate has a common electrode 24 which supplies a common voltage to the liquid crystal pixel cells; and a upper alignment film 36 on an upper substrate 2 for aligning liquid crystal.

The thin film transistor includes a gate electrode 6 connected to a gate line (not shown), a source electrode 8 connected to the data line 4, and a drain electrode 10 connected to the pixel electrode 22. Further, the thin film transistor includes an active layer 14 which overlaps the gate electrode 6 with a gate insulating film 12 therebetween to form a channel between the source electrode 8 and the drain electrode 10; and an ohmic contact layer 16 for reducing a contact resistance between the active layer 14 and the source and drain electrodes 8 and 10.

A passivation film 18 is formed on the gate insulating film to cover the thin film transistor and the data line 4.

The color filter 34 divided by pixel area is formed on the passivation film 18.

The black matrix 32 is formed to overlap the thin film transistor and to be laid over the adjacent color filters 34 along the gate line and the data line 4 on the passivation film 18 where the color filter 34 is formed. The black matrix 32 prevents an interference between the color filters 34, an external light reflection by the metallic gate and data bus line, and a light leakage current caused when a channel part of the thin film transistor 30 is exposed to the external light.

An overcoat layer 52 made of an organic insulating material is formed on the color filter 34 and the black matrix 32. The overcoat layer 52 provides an even surface by compensating a step difference between the color filter 34 and the black matrix 32, and prevents foreign materials of the color filter 34 and the black matrix 32 from flowing into the liquid crystal.

The pixel electrode 22 is independently fowled at each of the pixel areas so as to overlap the color filter 34 on the overcoat layer 52. The pixel electrode 22 is connected to the drain electrode 10 that is exposed through a contact hole 20 that penetrates the overcoat layer 52, the color filter 34 and the passivation film 18.

The upper and lower alignment films 36 and 38 for aligning liquid crystal are formed by performing a rubbing process after spreading an alignment material such as polyimide on the upper and lower substrates 1 and 2.

The lower plate and the upper plate are bonded together with a gap, the liquid crystal is then injected between the gap, and then they are sealed so as to complete the liquid crystal display panel. Alternatively, the liquid crystal is spread over any one of the two substrates, and then the two substrates are bonded together to complete the liquid crystal display panel.

In order to bond the lower and upper plates together, the liquid crystal display includes a lower align mark 26 on the lower substrate 1, and a upper align mark 28 on the upper substrate 2. The lower align mark 26 and the upper align mark 28 are removed in a scribing process after the bonding process.

The lower align mark 26 is formed together with the gate electrode 6 or the black matrix 32 on the lower substrate 1 in a process of forming the gate electrode 6 or the black matrix 32. However, the upper alignment mark 28 is formed on the upper substrate 2 by an extra photolithography process using an opaque metal material different from the common electrode 24. The common electrode 24 is formed of a transparent conductive material in a photolithography process. Accordingly, when fabricating the liquid crystal display of the COT structure, an additional photolithography process is required to form the upper alignment mark 28 on the upper substrate 2, thereby decreasing the productivity of the liquid crystal display of the COT structure.

SUMMARY OF THE INVENTION

Accordingly, the present invention is directed to a liquid crystal display and fabricating method thereof that substantially obviates one or more of the problems due to limitations and disadvantages of the related art.

An advantage of the present invention is to provide a liquid crystal display and fabricating method thereof that can improve productivity and yield.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes first and second substrates with a liquid crystal material therebetween; a first alignment film formed on the first substrate and a second alignment film formed on the second substrate; a first align mark on the first substrate, the first align mark formed of the same material as the first alignment film and formed in a shape of any one of circle, square and cross; and a second align mark to be aligned with the first align mark on the second substrate.

In the liquid crystal display, wherein the shape of second align mark corresponds to the shape of the first align mark.

In the liquid crystal display, the first align mark is about 600 µm~about 1200 µm in size.

The liquid crystal display further includes a data line and a gate line which cross each other on the second substrate; a thin film transistor formed at a crossing of the data line and the gate line; a pixel electrode connected to the thin film transistor; one of R, G and B color filters overlapped with the pixel electrode; and a black matrix overlapped with the data line and the gate line.

In the liquid crystal display, the black matrix is formed to be laid over the R, G, B color filters to distinguish the R, G, B color filters.

The liquid crystal display further includes a common electrode which is formed on the second substrate and which forms a horizontal electric field with the pixel electrode.

Alternatively, the liquid crystal display further includes a common electrode which is formed on the first substrate and which forms a vertical electric field with the pixel electrode.

In another aspect of the present invention, a fabricating method of a liquid crystal display includes forming a first alignment film for aligning liquid crystal and a first align mark made of the same material as the first alignment film on a first substrate, wherein the first align mark has a shape of any one of a circle, square and cross; forming a second alignment film for aligning liquid crystal and a second align mark to be aligned with the first align mark on a second substrate; aligning the first and second substrates using the first and second align marks; and bonding together the first and second substrates with the liquid crystal therebetween.

In the fabricating method, wherein the second align mark has a shape corresponding to the first align mark.

In the fabricating method, the first align mark is about 600 µm~about 1200 µm in size.

The fabricating method further includes forming a gate line on a second substrate; forming a data line to cross the gate line and a thin film transistor at a crossing part of the data line and the gate line; forming one of R, G and B color filters overlapped with a pixel electrode; forming a black matrix overlapped with the data line and the gate line; and forming the pixel electrode connected to the thin film transistor.

In the fabricating method, the black matrix is formed to be laid over the color filter to distinguish the neighboring R, G or B color filter.

The fabricating method further includes forming a common electrode on the first substrate to form a horizontal electric field with the pixel electrode.

The fabricating method further includes forming a common electrode on the second substrate to form a vertical electric field with the pixel electrode.

In yet another aspect of the present invention, a method of fabricating a liquid crystal display (LCD) device includes forming a first alignment film and a first align mark on a first substrate at the same time; forming a second align mark to be aligned with the first align mark on a second substrate; providing a liquid crystal material between the first and second substrates; aligning the first and second substrates using the first and second align marks; and bonding together the first and second substrates using a seal material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a table with recognition experiment data of the upper align marks illustrated in FIGS. 3A to 3F.

DETAILED DESCRIPTION OF THE ILLUSTRATED EMBODIMENT

Reference will now be made in detail to embodiments of the present invention, examples of which are illustrated in the accompanying drawings.

Figure 1:
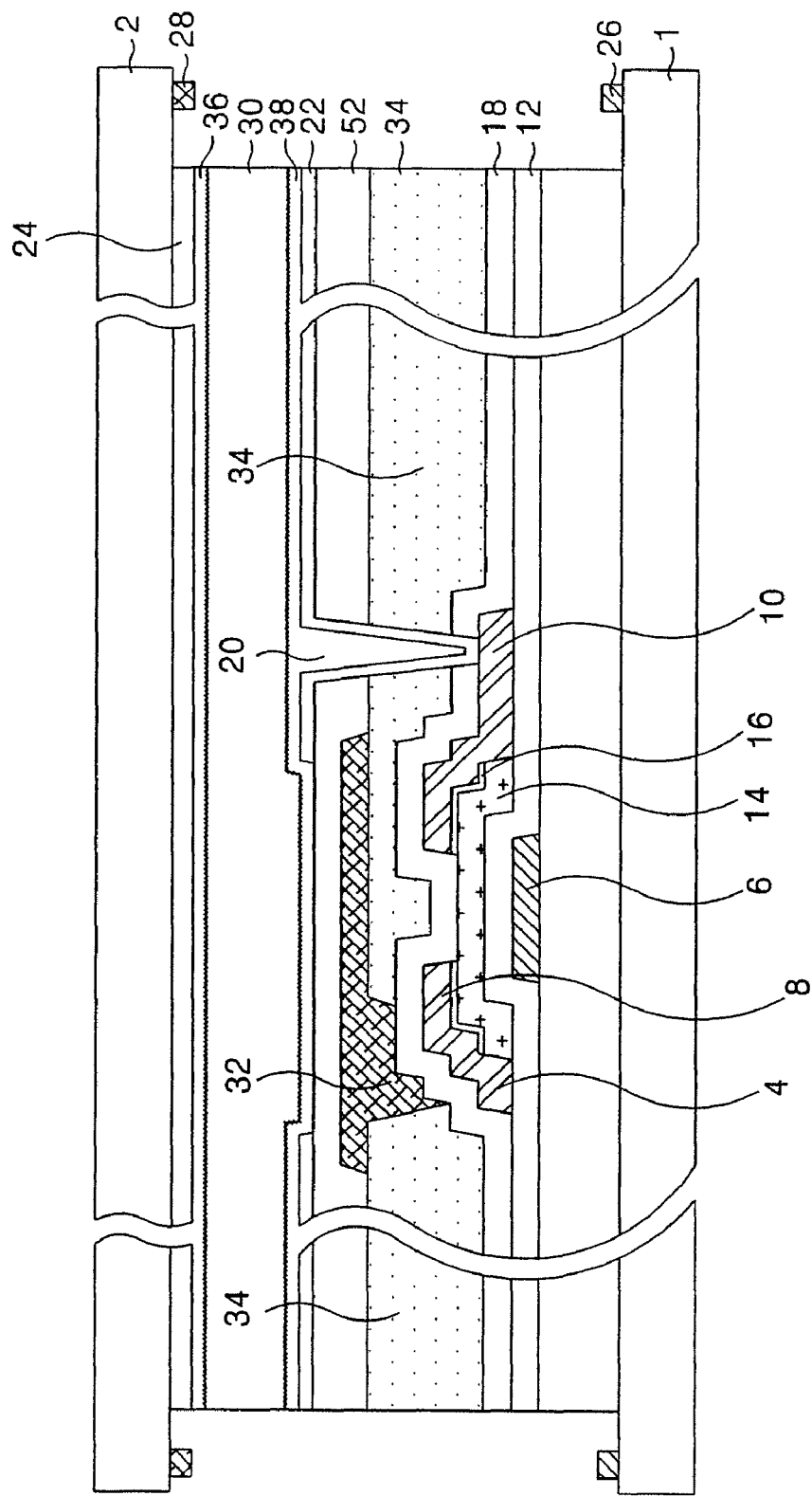
FIG. 1 is a cross-sectional view illustrating a liquid crystal display of a color filter on thin film transistor structure according to the related art.
Figure 2:
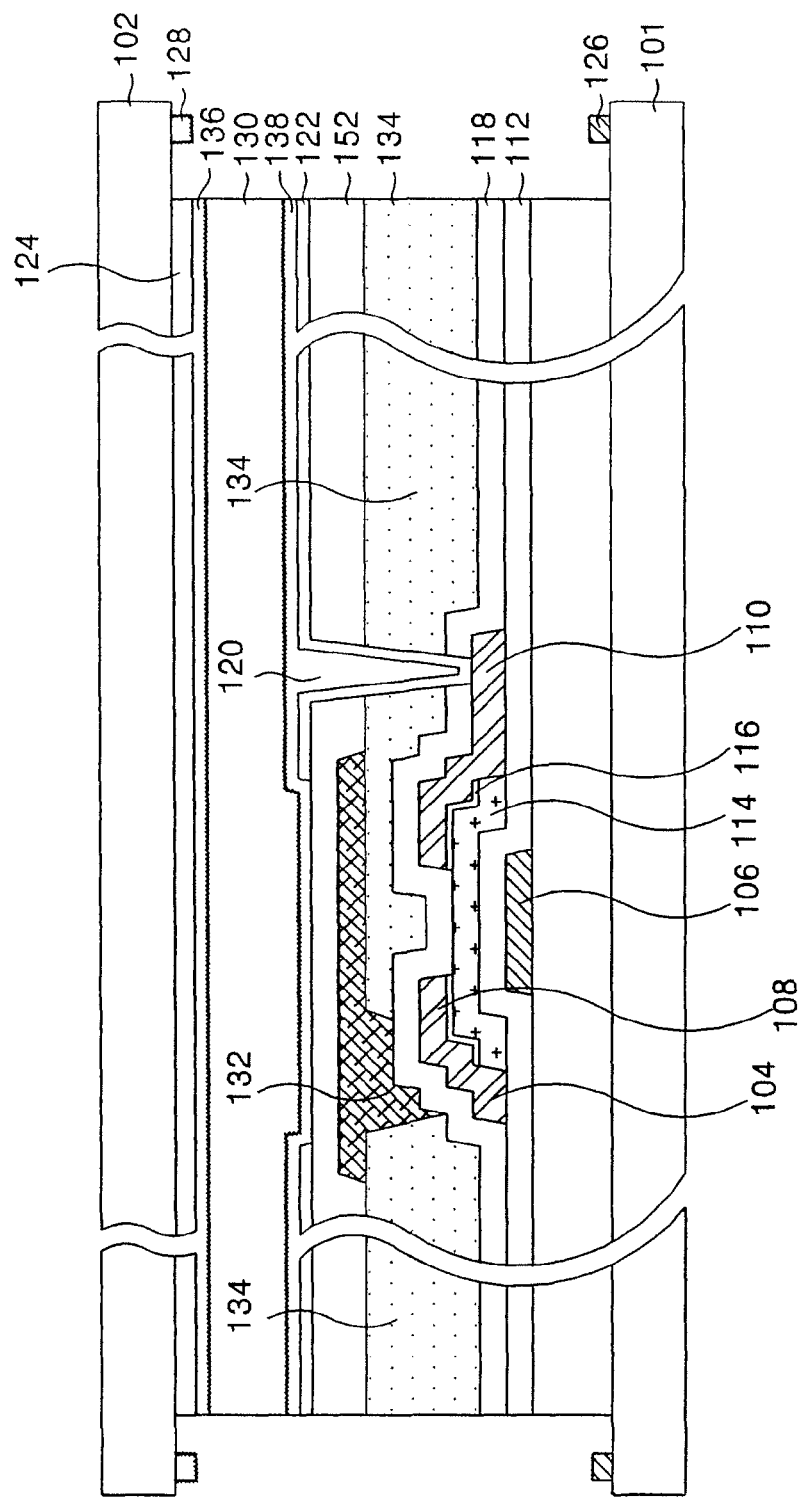
FIG. 2 is a cross-sectional view illustrating a liquid crystal display of a color filter on thin film transistor structure according to an embodiment of the present invention.

FIG. 2 is a cross-sectional view illustrating a liquid crystal display of a COT structure according to an embodiment of the present invention.

Referring to FIG. 2, the liquid crystal display of the COT structure according to an embodiment of the present invention includes a thin film transistor substrate (a lower plate) and a upper plate. The lower plate has a thin film transistor on a lower substrate 101; a color filter 134 for realizing R, G, B pixels formed on the thin film transistor and a black matrix 132; a pixel electrode 122 overlapped with the color filter 134 with an overcoat layer 152 therebetween; and the color filter having a lower alignment film 138 for aligning liquid crystal. On a upper substrate 102, the upper plate has a common electrode 124 which supplies a common voltage to the liquid crystal pixel cells; and a upper alignment film 136 for aligning liquid crystal.

The thin film transistor includes a gate electrode 106 connected to a gate line (not shown), a source electrode 108 connected to the data line 104, and a drain electrode 110 connected to the pixel electrode 122. Further, the thin film transistor includes an active layer 114 which overlaps the gate electrode 106 with a gate insulating film 112 therebetween to form a channel between the source electrode 108 and the drain electrode 110; and an ohmic contact layer 116 for reducing a contact resistance between the active layer 114 and the source and drain electrodes 108, 110.

A passivation film 118 is formed on the gate insulating film 112 to cover the thin film transistor and the data line 104.

The color filter 134 formed on the passivation film 118 is divided by pixel areas. In this case, the color filter 134 is formed to not overlap with the gate line and the data line 104, or to partially overlap.

The black matrix 132 is formed to overlap the thin film transistor and to be laid over the adjacent color filters 134 along the gate line and the data line 104 on the passivation film 118 where the color filter 134 is formed. The black matrix 132 prevents interference between the color filters 134, external light reflection by the metallic gate and data lines, and a light leakage current caused when a channel part of the thin film transistor 130 is exposed to the external light.

An overcoat layer 152 made of an organic insulating material is formed on the color filter 134 and the black matrix 132. The overcoat layer 152 provides an even surface by compensating a step difference between the color filter 134 and the black matrix 132, and prevents foreign materials from the color filter 134 and the black matrix 132 from flowing into the liquid crystal.

The pixel electrode 122 is independently formed at each of the pixel areas so as to overlap the color filter 134 on the overcoat layer 152. The pixel electrode 122 is also connected to the drain electrode 110 that is exposed through a contact hole 120 that penetrates the overcoat layer 152, the color filter 134 and the passivation film 118.

The upper and lower alignment films 136 and 138 for aligning liquid crystal are formed by performing a rubbing process after spreading an alignment material such as polyimide on the lower and upper substrates 101 and 102.

The lower plate and the upper plate are bonded together with a gap, the liquid crystal is then injected between the gap, and then the bonded lower and upper plates are sealed so as to complete the liquid crystal display panel. Alternatively, the liquid crystal is spread over any one of the two substrates, and then the two substrates are bonded together to complete the liquid crystal display panel.

In order to bond the lower and upper plates together, the liquid crystal display according to the embodiment of the present invention includes a lower align mark 126 that is formed on the lower substrate 101 during the formation of either the gate electrode 106 or the black matrix 132, and a upper align mark 128 which is formed on the upper substrate 102 during the formation of the upper alignment film 136. The lower align mark 126 and the upper align mark 128 are removed in a subsequent scribing process after the bonding process.

The upper alignment film is transparent to some extent, but has a light yellow tone, unlike the transparent common electrode 124. Further, the upper align mark 128 has a predetermined pattern to improve the accuracy of alignment according to an embodiment of the present invention.

FIGS. 3A to 3F are views illustrating various examples of an align mark used on the upper and lower plates.

Figure 3A:
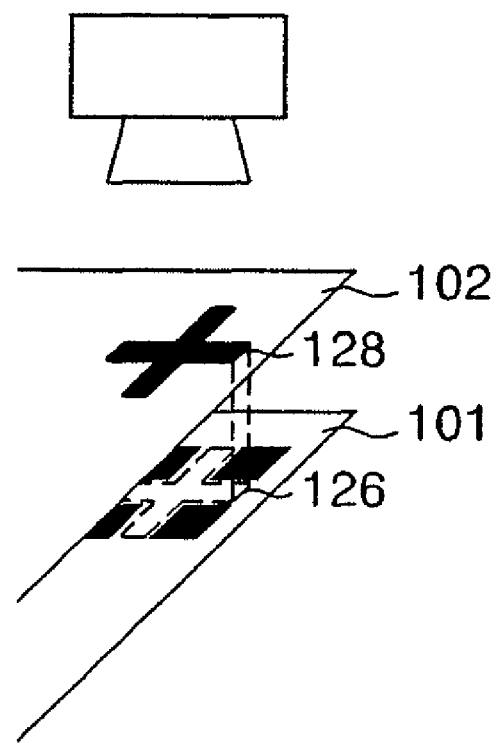
FIGS. 3A to 3F are views illustrating various examples of an align mark according to an embodiment of the present invention.
Figure 3B:
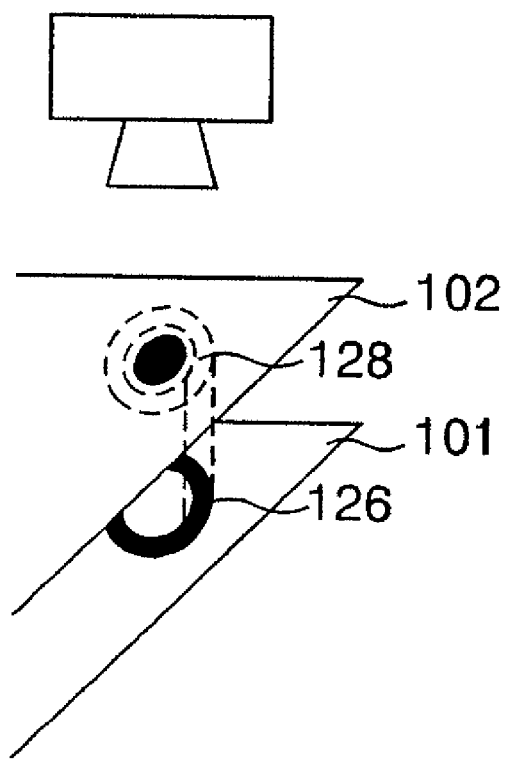
Figure 3C:
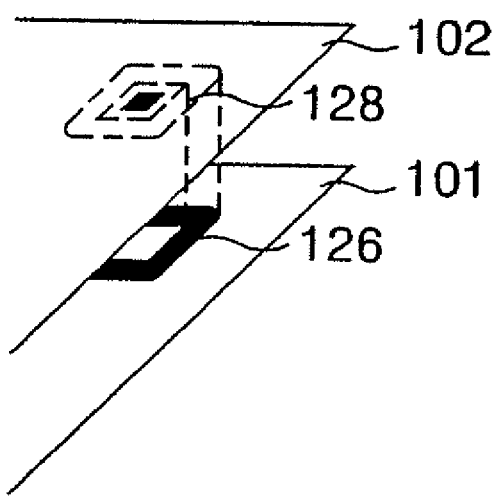
Figure 3D:
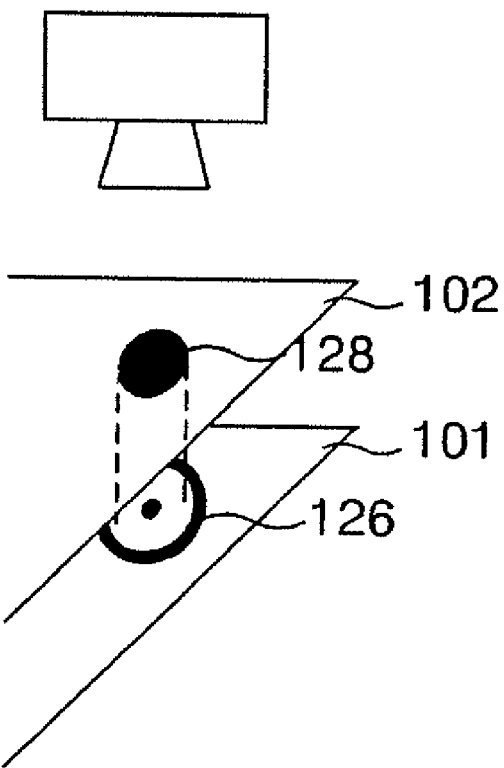
Figure 3E:
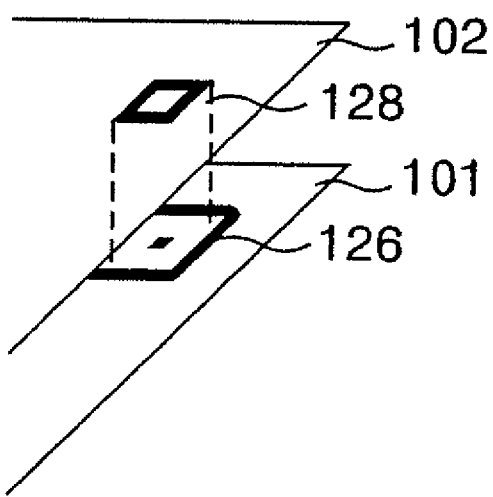
Figure 3F:
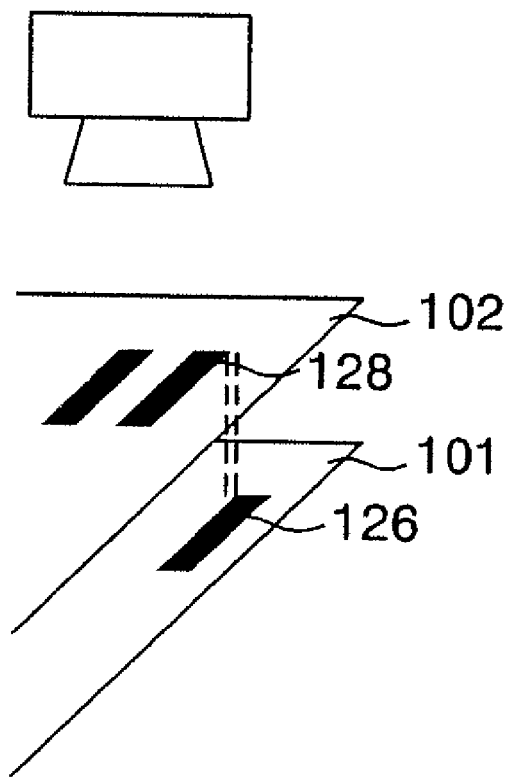

Referring to FIGS. 3A to 3F, the upper and lower align marks 128 and 126 are formed in various shapes for aligning the upper and lower plates. In these examples, the upper align mark 128 on the upper substrate 102 has a pattern corresponding to the shape of the lower align mark 126. The upper align marks 128 of FIGS. 3A to 3C are formed on the upper substrate 102 in shapes of cross, circle and square, respectively. And, the upper align marks 128 of FIGS. 3D to 3E are formed on the upper substrate 102 in shapes of circle and square having an aperture in the center. Further, the upper align mark 128 of FIG. 3F is formed on the upper substrate 102 in a shape of two rectangles.

FIG. 4 is a table with recognition experiment data of the upper align marks illustrated in FIGS. 3A to 3F.

In the recognition experiments, the upper align mark 128 has a size of about 600 μm~about 1200 μm for the small pattern and has a size of about 1200 μm~about 3000 μm for the large pattern. In FIG. 4, patterns 'a' to 'f' respectively correspond to the patterns of the upper align mark 128 illustrated in FIGS. 3A to 3F.

Referring to FIG. 4, in case of the small pattern, the patterns 'a' to 'c' appear to have a higher recognition rate than the patterns 'd' to 'f', because the Z bench values of the patterns 'a' to 'c' have relatively higher values than those of the patterns 'd' to 'f'. The Z bench value represents the stability of a process, an index used for the "6-sigma" as known in the world. The defect rate of the process is lower as the Z bench value is higher.

Referring back to FIG. 4, in case of the patterns 'a' to 'c', the Z bench values are more than 2 in the first and second experiments and thus appear to be higher in comparison with the patterns 'd' to 'f'. Specially, the Z bench values of the patterns 'b' and 'c' appear to be more than 3 in the first and second experiments, meaning that the recognition rate is very high.

However, the results of the align mark recognition experiments for the large pattern appear to be different from the results of the align mark recognition experiments for the small pattern, i.e., the Z bench values of all the patterns except for the pattern 'a' appear to be less than 2.

Based on the results of the align mark recognition experiments, the size and shape of the upper align mark 128, which is formed in the same process as the upper alignment film 136, can be determined. As described above, the recognition rate is improved when the upper align mark 128 is formed with a size of about 600 μm~about 1200 μm and in the shapes illustrated in FIGS. 3A to 3C.

Figure 5:
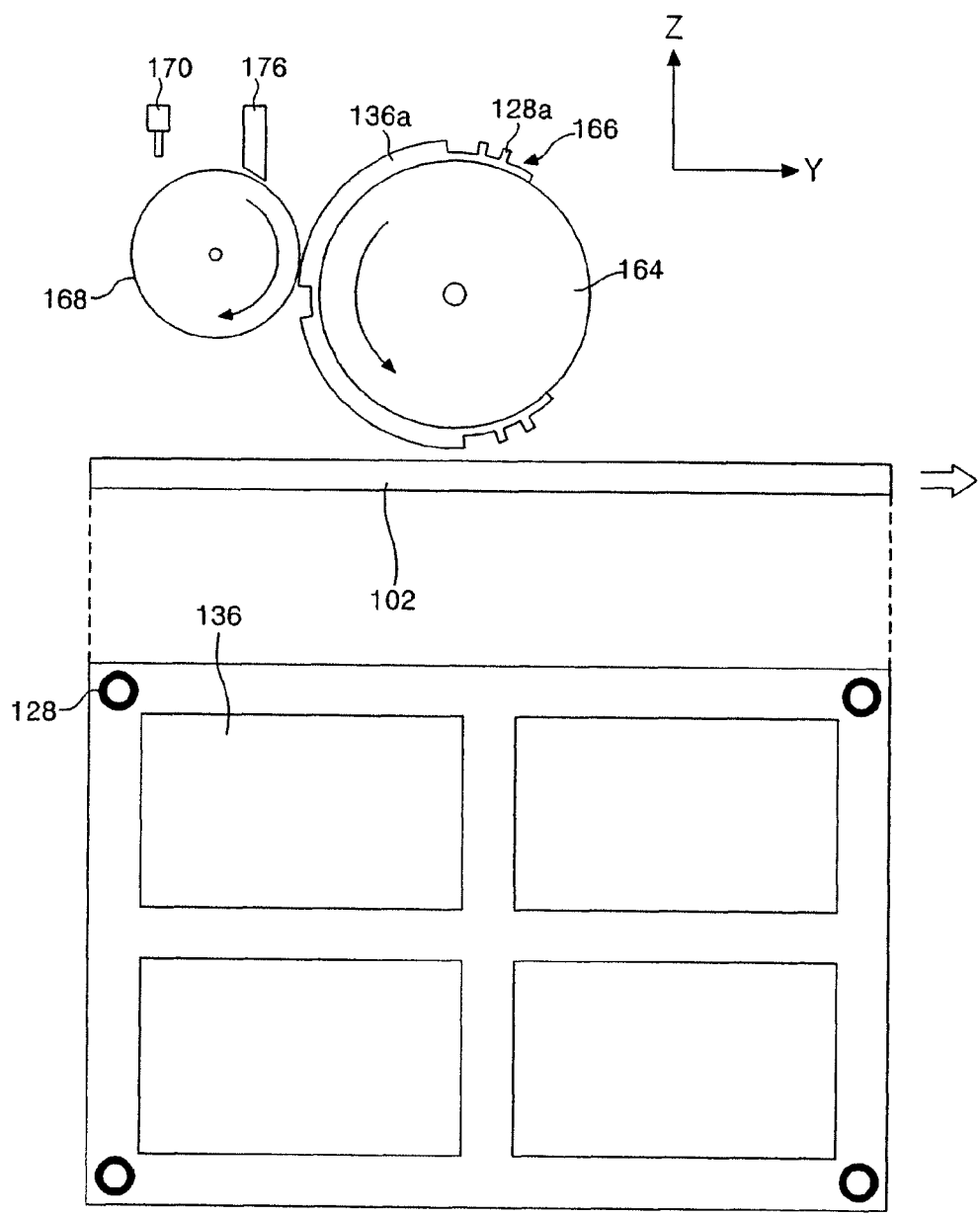
FIG. 5 illustrates an apparatus for forming the upper align mark according to an embodiment of the present invention.

FIG. 5 illustrates an apparatus for forming the upper align mark according to an embodiment of the present invention.

Referring to FIG. 5, the apparatus for forming the upper alignment film 136 and the upper alignment mark 128 includes a supply roller 168 over which polyimide, a material of the upper alignment film 136 and the upper align mark 128, is spread; a print roller 164 to which a resin plate 166 is attached for printing the polyimide; and the upper substrate 102 loaded under the print roller 164.

The polyimide falls into the supply roller 168 from a dispenser 170 installed in a upper part. A blade 176 is installed in the surface of the supply roller 168 to uniformly spread the polyimide over the resin plate 166. The print roller 164 transfers the polyimide to the locations of the adhered resin plate 166 corresponding to a upper align mark pattern 128a and a upper alignment film pattern 136a. By further rotating the print roller 164, the polyimide can be printed on the upper substrate 102 to form the upper align mark 128 and the upper alignment film 136. In this way, the upper align mark 128 is formed in the same process as the upper alignment film 136, thereby reducing the number of photolithography processes compared to the related art fabrication method. Accordingly, a method of fabricating a liquid crystal display according to the present invention can reduce the cost and improve the productivity.

According to the embodiments of the present invention, the upper align mark is formed with a size of about 600 μm~about 1200 μm and in the shapes of cross, circle and square to improve the recognition rate is improved. At this time, the shape of the lower align mark is formed to be in accordance with the shape of the upper align mark.

The present invention is explained with a liquid crystal display of a COT structure in which the common electrode is formed on the upper substrate, but the principles of the present invention can also be applied to a liquid crystal display of a COT structure in which the common electrode is formed on the lower substrate.

As described above, a liquid crystal display and fabricating method thereof according to the present invention can reduce the number of photolithography processes, as the upper align mark is formed during the formation of the upper alignment film. Accordingly, the cost for producing the liquid crystal display can be reduced and its productivity may be increased.

In addition, a liquid crystal display and fabricating method thereof according to the present invention forms the upper align mark with a size of about 600 μm~about 1200 μm and in the shape of a cross, circle or square to improve the recognition rate. Accordingly, the yield of the liquid crystal display can also be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display (LCD) device, comprising:
    forming a first alignment film for aligning liquid crystal and a first align mark made of the same material as the first alignment film on a first substrate at the same time, wherein the first align mark has a shape of a square having an aperture in the center, wherein the first alignment film and the first align mark are formed by a print roller having resin plate;
    forming a second alignment film for aligning liquid crystal and a second align mark to be aligned with the first align mark on a second substrate, wherein the second align mark includes a first mark and a second mark, wherein the first mark has a shape of a square having an aperture in the center, wherein the first mark is greater than the first align mark, wherein the second mark has a shape of a square dot, wherein the second mark is smaller than both the aperture of the first align mark and the aperture of the first mark, and wherein the second mark is positioned at the aperture of the first mark so that the second mark is surrounded by the first mark;
    providing a liquid crystal material between the first and second substrates;
    aligning the first and second substrates using the first and second align marks; and
    bonding together the first and second substrates;
    wherein the first alignment film and the first align mark have a light yellow tone.

2. The method according to the claim 1, wherein the first align mark has a size of about 600 μm~about 1200 μm.

* * * * *